United States Patent [19]

Manser

[11] 4,323,585
[45] Apr. 6, 1982

[54] PROCESS FOR THE PRODUCTION OF PASTA PRODUCTS PACKED READY FOR SALE IN SERVING PORTIONS IN PACKAGES

[75] Inventor: Josef Manser, Uzwil, Switzerland

[73] Assignee: Gebrueder Buehler A.G., Uzwil, Switzerland

[21] Appl. No.: 121,520

[22] Filed: Feb. 14, 1980

[30] Foreign Application Priority Data

Feb. 15, 1979 [CH] Switzerland .......................... 1499/79

[51] Int. Cl.³ .......................... A23L 1/16; F26B 3/04; F26B 11/18; B65B 23/00
[52] U.S. Cl. ...................................... 426/394; 34/195; 34/197; 53/428; 53/440; 426/398; 426/402; 426/451; 426/124; 426/128; 426/119
[58] Field of Search ............... 426/557, 451, 124, 128, 426/402, 458, 438, 441, 452, 242, 394, 398, 119; 53/440, 428; 34/195, 197, 237

[56] References Cited

U.S. PATENT DOCUMENTS

| 918,436 | 4/1909 | Gammel | 426/451 |
|---|---|---|---|
| 1,286,029 | 11/1918 | Kraybill | 426/451 |
| 1,753,733 | 4/1930 | Ambrette | 426/451 |
| 2,074,458 | 3/1937 | Cavagnaro | 426/451 |
| 2,621,615 | 12/1952 | Lombardi | 426/451 |
| 2,890,122 | 6/1959 | Katon | 426/119 |
| 3,318,707 | 5/1967 | Ernst | 426/451 |
| 3,328,174 | 6/1967 | Bassano | 426/451 |
| 3,352,686 | 11/1967 | Mancuso | 426/451 |
| 3,537,862 | 11/1970 | Peters et al. | 426/451 |
| 3,654,746 | 4/1972 | Beckers | 426/124 |
| 3,843,806 | 10/1974 | Kishpaugh | 426/106 |
| 3,908,029 | 9/1975 | Fredrickson | 426/557 |
| 4,002,773 | 1/1977 | Entenmann | 426/392 |
| 4,120,984 | 10/1978 | Richardson et al. | 426/128 |
| 4,208,439 | 6/1980 | Hsu | 426/451 |

FOREIGN PATENT DOCUMENTS 319312 12/1971 U.S.S.R. .............................. 426/557

OTHER PUBLICATIONS

Food Engineering 6/52 pp. 131, 133.
Industrial & Engineering Chemistry 5/41 pp. 642-647.

Primary Examiner—Steven L. Weinstein
Attorney, Agent, or Firm—John W. Bunch; Paul A. Welter

[57] ABSTRACT

With the process, pasta products are packed in serving portions, ready for sale. For doing this, the pasta products are separated into serving portions prior to drying and packing into the package. In order to avoid mechanical breakage, provision is made, when separating the pasta products, to lay at least one serving of pasta product onto a carrying member of the at least two-part package. Afterward, the carrying member is combined with the remaining packaging members into a package.

8 Claims, 9 Drawing Figures

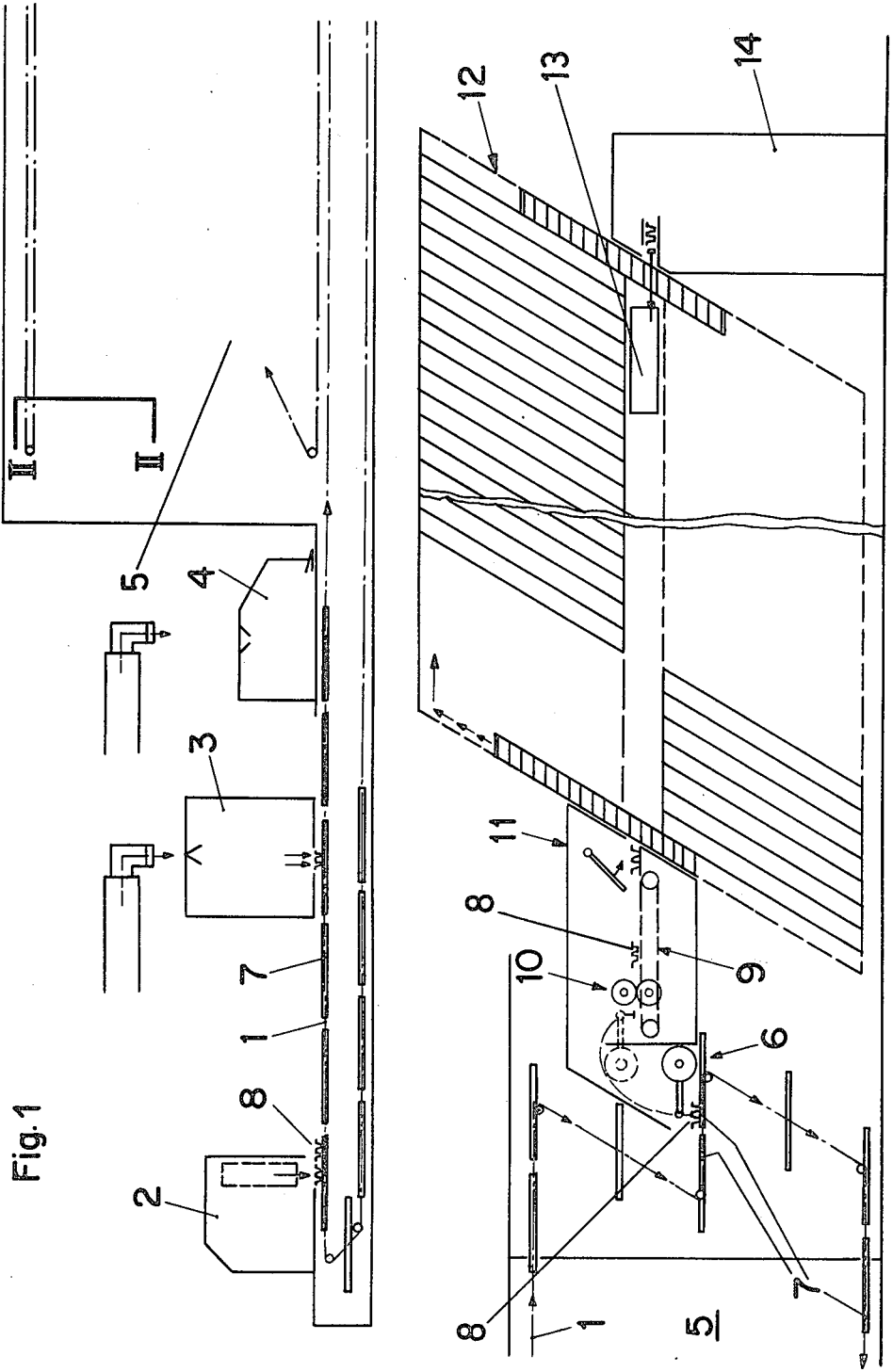

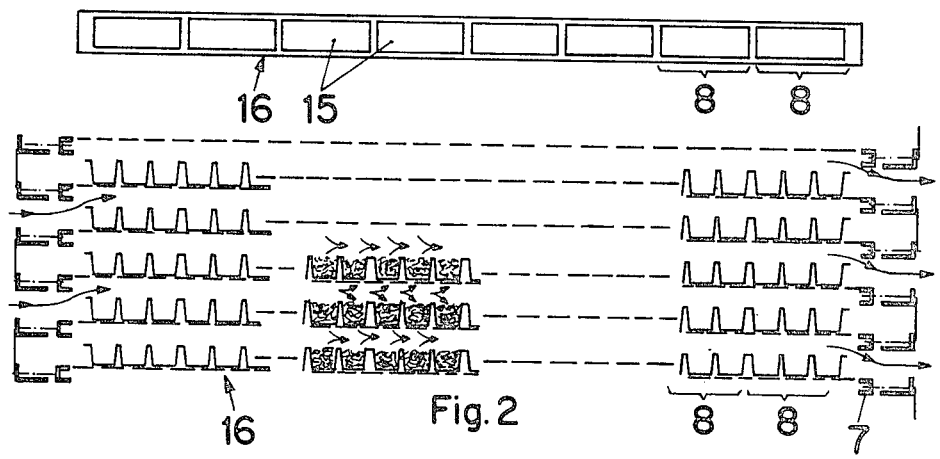
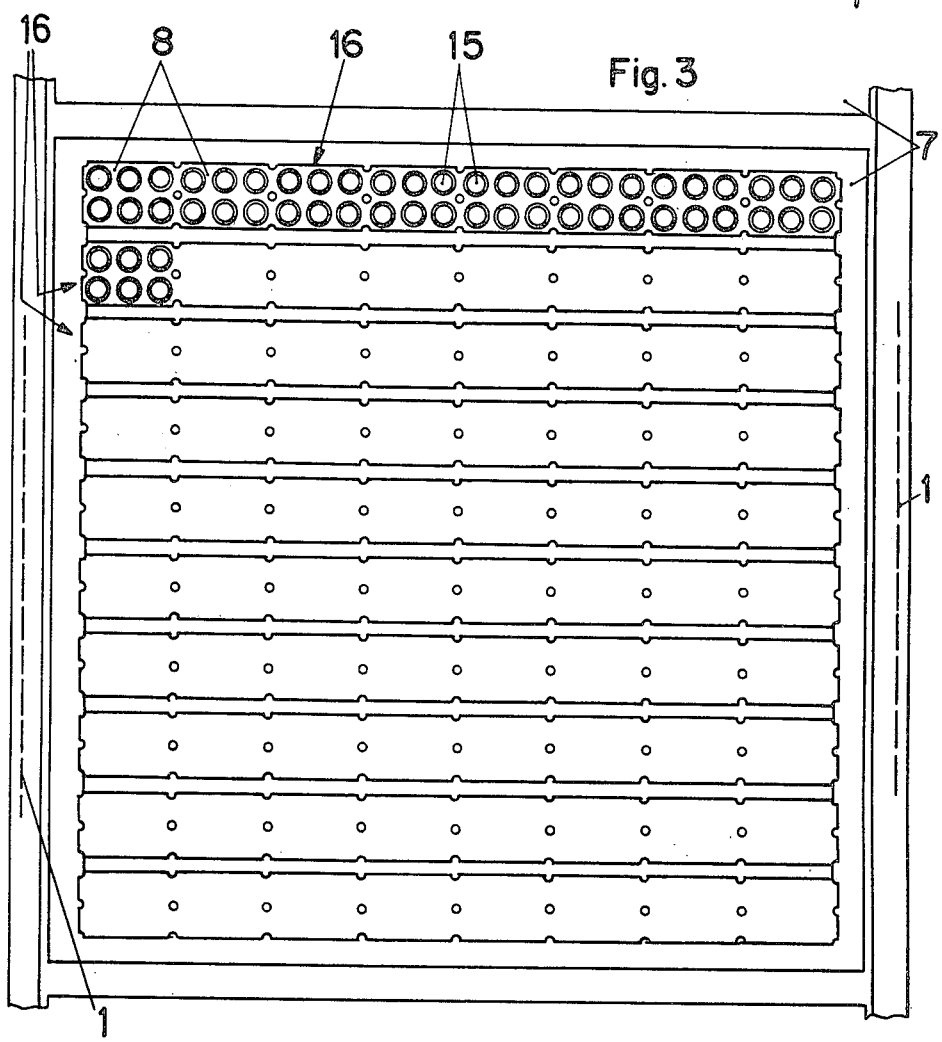

PROCESS FOR THE PRODUCTION OF PASTA PRODUCTS PACKED READY FOR SALE IN SERVING PORTIONS IN PACKAGES

BACKGROUND OF THE INVENTION

1. Field of the Invention

The present invention relates to a process for the production of pasta products in serving portions, with the pasta products being separated into serving portions before packing into the package.

2. Description of the Prior Art

As a rule, pasta products are packed in larger quantities established purely by weight. The market requirement for pasta products packed on the basis of eating portions led to the so-called coils and/or nests that today already make up a considerable proportion of the offering of pasta products. Such nests and/or coils are produced in a nest machine and/or coil laying machine arranged after the pasta product press. A "nest" is a pasta configuration formed, usually with the thinner pastas, by dropping the continuous string of pasta into a coiled, undulating, criss-crossed pattern that has the appearance of a birds nest, and dried in this shape. Nest and/or coil pasta products fall out of the nest or coil laying machine into a bowl-shaped receptacle. A number of such receptacles are attached to an endless transport belt with which the nests and/or coils are fed through a drying contrivance. This drying contrivance can be either a predryer only or a predryer and a final dryer. If the drying contrivance is a predryer only, then the nests and/or coils are removed from the bowl-shaped receptacle ahead of the final dryer, laid onto a conveying contrivance and fed through the final dryer on this conveying contrivance. However, the nests in the bowl-shaped receptacles can, subsequent to the predryer, also be fed through the final dryer and finish-dried in the receptacles. After the final dryer, the nests and/or coils are laid onto a conveyor belt or thrown off and delivered to a packing station. This known process has various disadvantages. When removing the nests and/or coils from the bowl-shaped receptacles and when packing, they are subjected to mechanical stresses that lead to a relatively high proportion of scrap. This loss of weight must be compensated for by the addition of fragments when packing the nests, which is detrimental to the appearance of the packed product. This proportion of scrap increases still further if the nests are stacked after removal from the bowl-shaped receptacles and prior to packing.

SUMMARY OF THE INVENTION

The task set forth for the present invention is to improve the initially mentioned type process such that essentially less scrap results.

In accordance with the invention, this purpose is achieved in that, when separating the pasta products, at least one serving portion of pasta product is laid onto a carrying member of the at least two-part package and that, afterward, the carrying member is combined with the remaining package parts for the purpose of packaging.

The invention has the advantage that intermediate stacking of the nests before packing, and packing itself, can be easily mechanized and automated.

In accordance with a preferred form of embodiment of the process, provision can be made so that separation of the pasta product portions and laying them onto the carrying member is accomplished at the pasta product press, and so that the carrying member is fed through the subsequent dryer(s) together with the serving portion of pasta product.

This form of embodiment has the advantage that the nest or the coil never needs be turned over or grasped by hand and, consequently, can be produced and packed with a high degree of hygieneity.

BRIEF DESCRIPTION OF THE DRAWINGS

The invention will be explained in form of an example with the aid of the accompanying drawing, in which:

FIG. 1 is a schematic representation of an automatic production line for carrying out the process in accordance with the invention;

FIG. 2 is a cut through the dryer alone line II—II in FIG. 1;

FIG. 3 is a cut out of a top view onto FIG. 2;

FIG. 6 is a top view onto a connected grouping of several members, with each carrying member displaying a recess for accepting a coil;

DESCRIPTION OF THE PREFERRED EMBODIMENT

Figure 5:
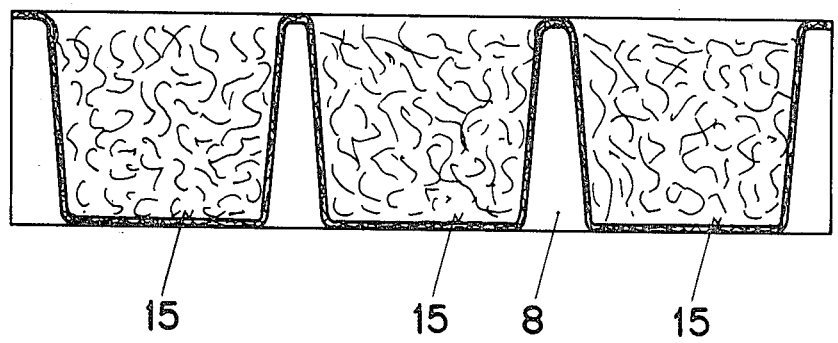
FIG. 5 is a cut along line V—V in FIG. 4.

FIG. 1 shows an automatic installation for production of pasta product nests and pasta product coils, respectively, packed ready for sale in packages. The installation displays an endless chain conveyor 1 that goes past a feeding mechanism 2 for carrying members 8, on to a nest machine 3 and/or to a coil laying machine 4. In a single-purpose installation, depending on the product desired, either the nest machine or the coil laying machine can be eliminated. After the coil laying machine 4 the chain conveyor 1 runs through a dryer 5 in which both predrying and final drying is accomplished. Inside the dryer 5, the chain conveyor runs zig-zag fashion about a multiplicity of guide rollers. Arranged on chain conveyor 1, after dryer 5, is a discharge station 6. Attached to the chain conveyor 1, at a uniform distance apart, are transport frames 7 that serve for accepting and transporting the carrying members 8 that have been mentioned.

Adjoining chain conveyor 1 is a second stretch of conveyor 9. The discharge station 6 removes the carrying members 8 from the transport frames 7 that are rotating with the chain conveyor 1 and lays them onto the transport mechanism 9, with the transport frames 7 being transported back to the feeding mechanism 2 by the chain conveyor 1. The transport mechanism 9 runs past a cutting station 10 that cuts apart carrying members 8 that were joined into a larger grouping 16. The individual carrying members 8 run, at the end of transport mechanism 9, in an inserting station 11 that pushes them away from the transport mechanism 9 and into a stacker 12. A feeder station 13 in the stacker 12 transfers the carrying members 8 to a packing machine 14 in which they are combined with the remaining packaging parts into the finished package.

Figure 4:
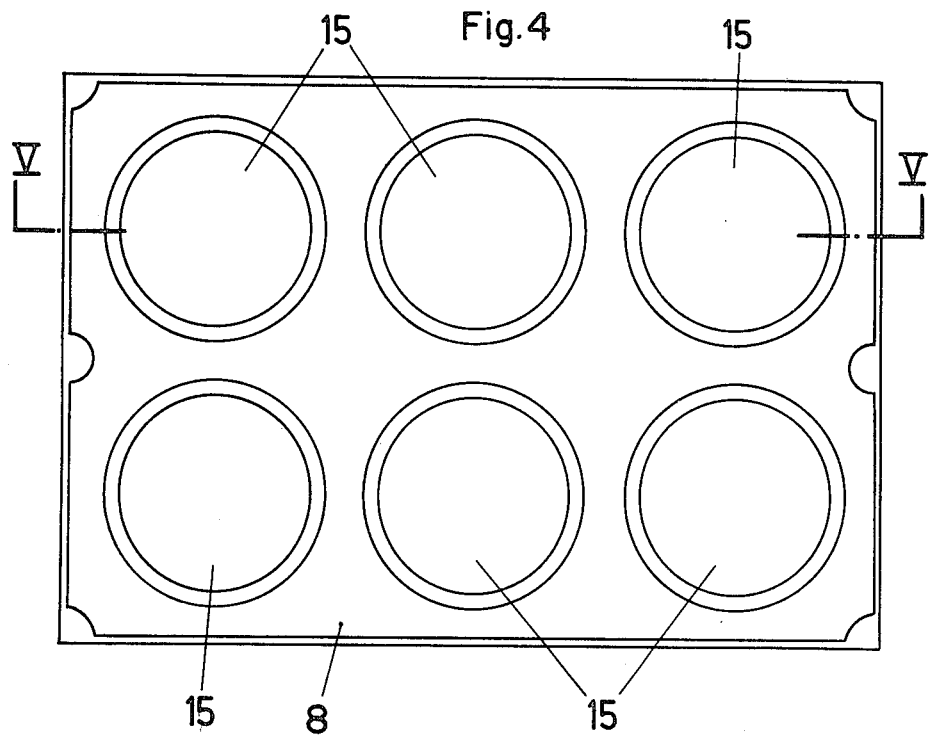
FIG. 4 is a top view onto a carrying member for six serving portions of pasta product and/or nests.

The carrying members 8 can be provided with one or several deposit surfaces 15, each for one serving portion of pasta product. For nests, as shown in FIGS. 4 and 5, the carrying members 8 can be provided with circular deposit surfaces 15 that form the bowl-like depression for the base. For production and packing of pasta product coils, the deposit surfaces 15 of carrying members 8, as shown in FIG. 6, can be structured rectangular and likewise be depressed bowl-like. The carrying members 8 consist, at least in the region of their deposit surfaces 15, of perforated, air permeable material. FIG. 3 shows how several carrying members 8, in the example illustrated eight of them, are joined together into a larger grouping 16. Several of these groupings 16 are laid onto a transport frame at the feeding mechanism 2. The transport frames 7 are fed through, step-fashion, below the nest machine which deposits the nests or coils row-fashion onto the joined carrying members, at the forward feed rate of the chain conveyor 1.

Each individual carrying member 8 forms part of a completed package. The nests and/or coils are thusly transported through the dryer 5 in one package part. According to FIG. 2, the transport frames 7 are moved increasingly to and fro in the dryer 5 and blown through with dry air in accordance with the sketched-in arrows. Here, the dry air flows between the transport frames 7 overlying one another, and through the porous deposit surfaces 15. The serving portions of pasta product lying on porous carrying members 8 come into uniform, inner contact with the dry air, which effects a uniform drying of the pasta products.

Figure 7:
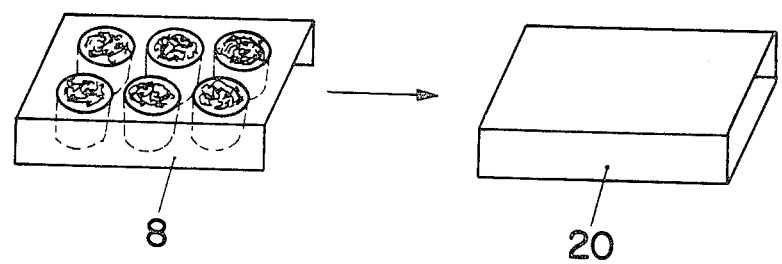
FIGS. 7 and 8 are each a perspective view of a carrying member for nests and/or a coil when being inserted in another packaging part.
Figure 8:
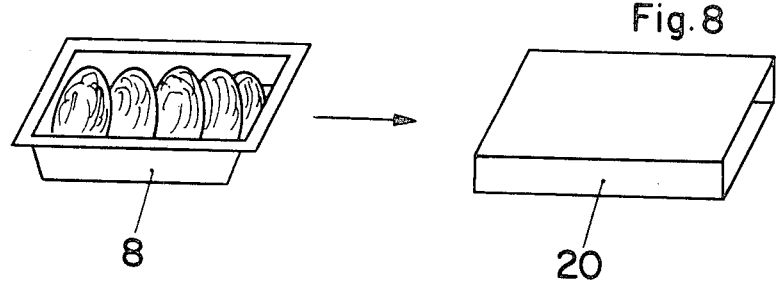

In the packaging machine 14 arranged at the end of the production line, the carrying members 8 are combined with at least one other packaging part 20 (FIGS. 7 and 8) into an easily handled package. This can be accomplished by pushing or inserting into the wrapper 20. However, it is also possible to wrap the carrying members 8 shown in FIGS. 4 and 5 into a closed package using foil.

Figure 9:
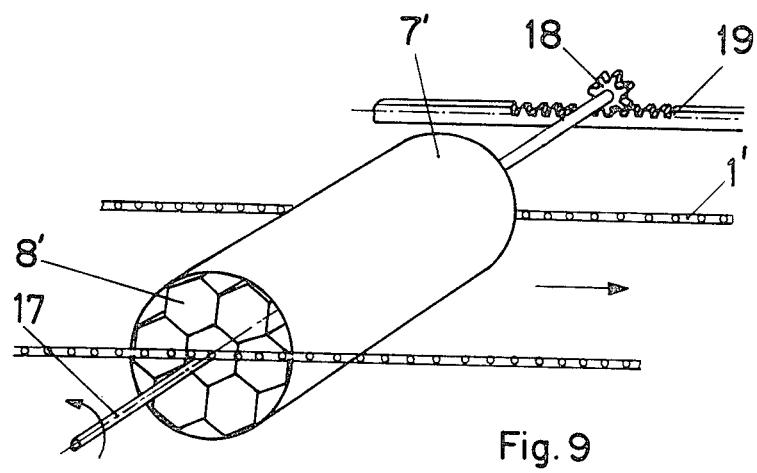
FIG. 9 is another example of embodiment of a carrying member.

FIG. 9 shows a further example of embodiment of a carrying member 8' for so-called long products. The carrying member 8' consists of seven honeycombs, hexagonal in cross section, joined together, and arranged inside a transport drum 7'. The hexagonal honeycombs are formed of a hot-shrink foil tubing, with the carrying member 8' obtaining its rigidity by dimension-exact fitting of the honeycombs in the transport drum 7'. The transport drum 7' has an axis of rotation 17 with which said drum is rotatably journalled in two chain rollers forming the chain conveyor 1'. Capable of being joined rotatably fixed with the axis of rotation 17 is a pinion and spur drive gear 18 that runs on a fixed gear rack 19 extending along chain conveyor 1'. In this fashion, transport drum 7', simultaneously with movement of the chain conveyor 1', receives a rotary movement so that the long products lying in the individual honeycombs are continuously rolled about and simultaneously circumcirculated with dry air. Filling of the individual honeycombs of carrying member 8' occurs at the pasta product press, where the pasta products slide, from the side, on an inclined slide into the honeycombs. After each honeycomb has been filled with a serving portion, chain conveyor 1' is transported, step-fashion, through the dryer 5 in the manner described. After the dryer 5, the carrying member 8' is shrunk by a blast of heat so that it can be taken from cylinder 7' and either intermediately stacked or final packed.

The honeycombs can also consist of shrinkable foil tubing of circular or circle-sector shaped cross section.

In the example of embodiment described, separation into serving portions of pasta product and depositing them onto carrying members 8 and 8' is done ahead of the predryer in the case of the nest or coil laying machine. Separation of pasta products into serving portions and depositing of the portions onto the carrying member can, in accordance with an example of embodiment that is not illustrated, be accomplished between the predryer and the final dryer.

What is claimed is:

1. A process for automatically producing pasta products packaged for sale in individual serving portions, comprising the steps of:
   positioning groups of interconnected first package portions for movement along a feed path, each first package portion being of porous material to allow circulating air to flow therethrough;
   depositing individual servings of predetermined pasta products directly onto the groups of first package portions, each first package portion including predetermined recesses thereon for receiving individual servings of the pasta products;
   advancing the groups of first package portions and servings of pasta products thereon into a dryer;
   circulating dry air through and around the first package portions substantially to dry the servings of pasta products thereon while in the dryer;
   removing the first package portions and dried servings of pasta products thereon from the dryer;
   separating the groups of first package portions into individual first package portions each having a plurality of individual servings of dried pasta products thereon; and
   combining the separated first package portions with second package portions to complete packaging of the individual servings of pasta products.

2. The process of claim 1, wherein the pasta products are nest shaped and the recesses in the first package portions are circular.

3. The process of claim 1, wherein the pasta products are coil shaped and the recesses in the first package portions are rectangular.

4. A process for automatically producing pasta products packaged for sale in individual serving portions, comprising the steps of:
   positioning first package portions for movement along a first feed path, each first package portion being of porous material to allow circulating air to flow therethrough;
   depositing individual servings of predetermined pasta products directly onto the first package portions, each first package portion having predetermined recesses thereon for receiving the pasta products;
   advancing the first package portions and individual servings of pasta products thereon along the first feed path into a dryer;
   circulating dry air through and around the first package portions substantially to dry the pasta products thereon while in the dryer;
   removing the first package portions from the dryer;
   transferring the first package portions to a second feed path;
   advancing the first package portions along the second feed path into a stacker for intermediate storage;
   removing the first package portions from the stacker; and combining the first package portions with second package portions to complete packaging of the individual servings of pasta products.

5. The process of claim 4, wherein the pasta products are nest shaped and the recesses in the first package portions are circular.

6. The process of claim 4, wherein the pasta products are coil shaped and the recesses in the first package portions are rectangular.

7. The process of claim 4, wherein groupings of interconnected first package portions are advanced along the first feed path, and further including between the steps of removing the first package portions from the dryer and combining the first package portions with second package portions, the step of:

separating the groups of first package portions into individual first package portions each having a plurality of individual servings of dried pasta products thereon.

8. A process for producing pasta products packaged for sale in individual serving portions, comprising the steps of:

providing a first transport mechanism mounted for movement around a course;

positioning groups of interconnected first package portions onto the first transport mechanism for movement therewith, each first package portion being of porous material to allow circulating air to flow therethrough;

advancing the groups of first package portions on the first transport mechanism to a pasta product machine;

depositing individual servings of predetermined pasta products from the pasta machine directly onto the groups of first package portions, each first package portion including predetermined recesses thereon for receiving servings of pasta products;

advancing the groups of first package portions on the first transport mechanism from the pasta product machine into a dryer;

circulating dry air through and around the groups of first package portions while in the dryer substantially to dry the servings of pasta products thereon;

removing the groups of first package portions from the dryer;

transferring the groups of first package portions from the first transport mechanism to a second transport mechanism extending between the dryer and a stacker;

separating the groups of first package portions into individual first package portions each having a predetermined number of individual servings of dried pasta products thereon;

advancing the individual first package portions on the second transport mechanism into the stacker;

removing the individual first package portions from the stacker; and combining the first package portions with second package portions to complete packaging of the individual servings of pasta products.

* * * * *